J. H. MARTIN, Jr.
THERMOSTATIC TRAP OR VALVE.
APPLICATION FILED APR. 19, 1915.

1,162,725.

Patented Nov. 30, 1915.

Witness:
Harry S. Gaither
Oscar W. Bond

Inventor:
James H. Martin Jr

UNITED STATES PATENT OFFICE.

JAMES H. MARTIN, JR., OF CHICAGO, ILLINOIS.

THERMOSTATIC TRAP OR VALVE.

1,162,725.

Specification of Letters Patent.

Patented Nov. 30, 1915.

Application filed April 19, 1915. Serial No. 22,454.

*To all whom it may concern:*

Be it known that I, JAMES H. MARTIN, Jr., a citizen of the United States, residing at Chicago, in the county of Cook and State of Illinois, have invented certain new and useful Improvements in Thermostatic Traps or Valves, of which the following is a specification, reference being had to the accompanying drawings, forming a part hereof.

This invention relates to thermostatic traps or valves more especially adapted and intended for use at the discharge or return end of a steam radiator or heating unit for discharging the water of condensation from the radiator or heating unit into a return pipe connected with the trap or valve and leading to the point of final discharge of the water of condensation.

The objects of the invention are to simplify and improve the construction and operation of thermostatic traps or valves; to improve the operation of the elements constituting the interior or operative mechanism of the trap or valve; to enable the interior or operative mechanism of the trap or valve to be adjusted without removing the trap or valve from the radiator or heating unit; to permit repairs of the interior or operative mechanism to be made without any trouble or inconvenience; to replace a worn out or inoperative thermostatic cell or chambered diaphragm or member without any other change than substituting a new cell, diaphragm or member for the old one; to insure a perfect and reliable operation in automatically discharging the water of condensation; to improve generally the construction, arrangement and operation of the several parts or elements of the trap or valve as a whole.

The invention consists in the location and arrangement of the several elements or parts constituting the trap or valve; and in the combination of elements or parts hereinafter described and pointed out in the claims as new.

Figure 1:
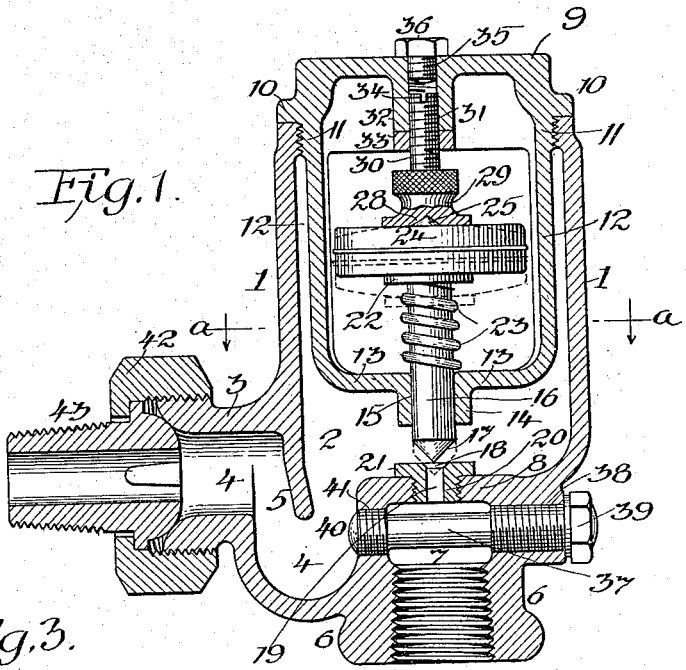
Figure 2:
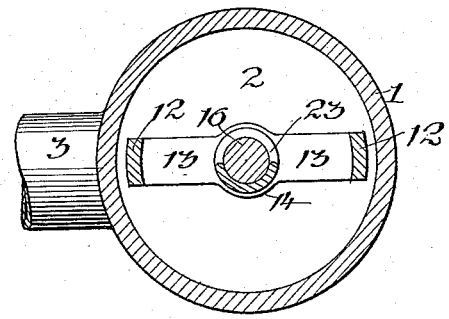

In the drawings:—Figure 1 is a sectional elevation of the shell or casing, the cap or cover, the hanger supporting the thermostatic elements or parts, and the coupling for attaching the trap or valve to the radiator, heating unit, or other appliance, and showing in full elevation, the thermostatic elements or parts; Fig. 2, a cross section on line, *a, a,* of Fig. 1 looking downward; and Fig. 3, a detail, partly in sectional elevation, and partly in full elevation, showing the thermostatic elements or parts separated one from the other.

The trap or valve of the present invention has an outer shell or casing, 1 inclosing a water chamber 2, which receives thereinto the water of condensation and in which is located the thermostatic device controlling the outlet from such water chamber. The shell or casing 1 is open at its upper end, and has on one side, a laterally projecting nipple 3 having a passage 4, which furnishes a conduit or inlet of a "goose-neck" formation leading to the water chamber, by which the water of condensation is conducted from the radiator or heating unit or other appliance to the water chamber of the trap or valve as usual. A baffle plate 5 projects downwardly into the inlet, conduit, or passage 4, and acts to deflect any dirt or sediment in the water or condensation, and deposit the same in the curved lower side of the inlet, conduit, or passage 4, which serves as a pocket or receptacle for the dirt or sediment. The lower end or bottom of the shell or casing 1 has a nipple 6 with an outlet or discharge passage 7, in communication with the water chamber 2, and separated from the water chamber by a cross-wall 8, in the construction shown. The passage 7 is screw threaded for attaching the trap or valve to the return pipe or other discharging means.

The open upper end of the wall or casing is closed by a cover 9, having a lateral flange 10, which, when the cover is in place, abuts closely against the end face of the shell or casing 1, and tightly closes the open end of such shell or casing. The cap or cover 9 also has a vertical rim or flange 11, below the lateral rim or flange 10, and this rim or flange 11 has an exterior screw thread, engaging an interior screw thread at the upper end of the shell or casing 1 for attaching and securing the cap or cover firmly and tightly in place, to close the open upper end of the shell or casing and the water chamber.

The rim or flange 11 has depending from opposite sides thereof, arms or members 12, as shown in Fig. 1; and these arms or members 12 are connected at their lower ends by a cross-arm or member 13; and the arms or members 12 and 13, form a yoke or U shaped support or hanger carried by the cap or cover. The cross-arm or member 13 of the support or hanger has a central boss or hub 14, with an axial central hole or bore 15, through which passes a valve stem 16, the lower end of which, as shown, is tapered, or pointed to furnish a seating face 17, which coacts with a seating face 18 around the upper end of a port 19 in a plug 20, threaded into the cross wall 8, which plug, as shown, has an annular flange, 21 to engage the upper face of the bottom of crosswall 8, when the plug is in position. The port 19 furnishes communication between the water chamber 2, and the outlet or discharge chamber or passage 7, and this port is opened and closed by the movements of the valve stem 16, through the action of the thermostat which operates the valve stem.

The upper end of the valve stem 16, has a lateral flange or plate 22 and around the valve stem and between the cross arm or member 13 and the flange or plate 22, is a coil spring 23, which acts to hold the valve stem raised, leaving the port 19 normally open, but permits of a downward endwise movement of the valve stem 16 for the seating faces 17 and 18 to engage and close the port 19, and prevent the discharge of water from the chamber 2, until the spring 23 acts and raises the valve stem to open the port 19 for the water to discharge from the chamber.

Figure 3:
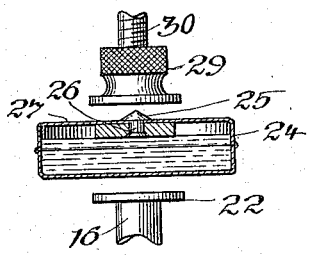

A thermostat 24, in the form of a cell or chambered diaphragm containing an expansible or vaporizing liquid or element, is mounted or supported on the flange or plate 22 of the valve stem 16; and preferably the cell or chambered diaphragm is detachably mounted or supported in place on the valve stem. The cell or chambered diaphragm in the form shown, has on its upper side a central conical bearing point or fulcrum 25, on the end of a stud 26 secured in a disk or plate 27, attached to the inner face of the top wall or plate of the cell or chambered diaphragm as shown in Fig. 3.

The bearing point 25 enters a countersunk bearing 28, centrally of a head 29, having a threaded stem 30, entered into a threaded hole 31 in a boss or hub 32, central of the cap or cover 9, so that the threaded stem 30 can be raised and lowered, or advanced and receded for adjusting the thermostat 24 and the slidable valve stem or member 16 for the proper co-action between the seating faces 17 and 18 to open and close the port 19 in the operation of the trap or valve. When the initial adjustment has been made the threaded stem 30 can be held in place by a lock-nut 33 or otherwise, if so desired. The final and proper adjustment for the seating faces 17 and 18 to co-act can be made, if necessary, when the trap or valve is connected with the radiator or other appliance; and for this purpose, the upper or outer end of the threaded stem 30 has a cross nick or notch 34, adapted to be engaged by a screw driver, or other instrument, by means of which the threaded stem 30 can be advanced or receded as may be required to adjust the seating faces 17 and 18 in proper co-acting relation.

The screw driver or other instrument can be used to complete the nominal or shop adjustment in connection with the cross nick or notch 34; and usually all that is required for shop adjustment is all that is required for positioning the seating faces. The screw driver or other instrument is inserted into the upper end of the threaded hole 31 to engage the nick or notch 34 of the stem 30, and after the adjustment has been made the hole 31 at its upper end is closed by a threaded plug or stud 35, having a head 36, suitably formed for inserting and removing the plug or stud. The head 29 can be milled, as shown, or otherwise formed, to furnish a finger hold or a grasping face for rotating the threaded stem 30 in assembling and adjusting the elements or parts of the thermostatic device as a whole; and, if desired, the upper end of the threaded hole 31 can be a different pitch than the stem-thread of the hole 31, so as to furnish a stop for the upward movement or threading of the stem 30 into place.

The parts or elements of the thermostatic device are assembled by placing the spring 23 around the valve stem 16 below the head or plate 22, then inserting the valve stem through the boss or hub 14, with the lower end of the spring abutting or resting on the cross-arm or member 13 of the support or hanger, then threading the stem 30 into the hole 31 and engaging the lock nut 33 with the end of the boss or hub 32, then depressing the valve stem 16, and slipping the thermostat 24 into place between the flange or plate 22 and the head 29, with the bearing point or fulcrum 25 entered into the bearing 28, then releasing the valve stem 16 for the spring 23 to act and press and hold the thermostat 24 between the valve stem and the adjusting screw, as shown in Fig. 1.

After the elements or parts of the thermostatic device are assembled as just described, the nominal or shop adjustment for the seating faces 17 and 18 can be made, with the cap or cover removed from the trap or valve, by advancing or receding the adjusting screw or threaded stem 30, the advance of the stem 30 advancing the seating end of the valve stem 16, and the receding of the stem 30 allowing the spring 23 to act and withdraw or retract the end of the valve stem, and for ordinary and general use, the nominal or shop adjustment will be sufficient for the trap or valve in use.

The construction of trap or valve shown has a cross-stem 37 below the water chamber with a threaded section 38, which takes into a threaded hole in the wall of the shell or casing, and a head 39 to receive a wrench or key by which the stem can be advanced and receded. The stem 37 has a screw threaded section or head 40, which enters a threaded port 41 furnishing a communication between the inlet, conduit, or passage 4 and the discharge chamber or passage 7, when the valve stem 37, is receded sufficiently for the hole or port 41 to be open. This arrangement is for the purpose of blowing off the trap or valve and to remove sediment and dirt in the usual manner. The nipple 3 has threaded thereon a nut 42 for attaching a tail piece 43, the nut and tail piece furnishing the coupling for connecting the trap or valve to a radiator or other place of use.

In use the trap or valve is connected with the radiator by the coupling 42 and 43 or other suitable means, and the water of condensation will flow through the conduit or inlet passage into the water chamber to be discharged through the port 19 and outlet passage or chamber 7 into the return pipe to the point of final discharge; and the water of condensation will continue to discharge until steam enters the water chamber 2 through the conduit or inlet passage and acting on the thermostat 24 will cause the medium in the cell or chamber diaphragm to expand and by such expansion force outward the walls of the cell or chambered diaphragm moving the valve stem 16 downward, for the seating faces 17 and 18 to come in contact, closing the outlet port 19 and shutting off the discharge of water from the chamber 2; and at same time closing the port 19 against the escape of steam. The port will remain closed until the water of condensation fills the chamber 2 and comes in contact with the cell, or chambered diaphragm, cooling the expansible medium and allowing the walls of the thermostat, cell or chambered diaphragm to return to normal position, which permits the spring 23 to act and raise the valve stem 16, opening the outlet port 19 for the water of condensation to escape from the chamber 2 into the return pipe, or other disposal means; and such discharge will continue until steam again enters the chamber and acts on the thermostat to close the outlet port, which remains closed until water or air enters the chamber and cools the thermostat and the outlet port is again opened to discharge the water. This alternate closing and opening of the outlet port continues as long as the trap or valve is in use.

It is to be noted that the thermostatic device as a whole is carried by the cap or cover and is entered into position when the cap or cover is attached to the open end of the shell or casing, so that the applying of the cap or cover at the same time enters the thermostat device correctly into operative position, which is a decided advantage in the construction of thermostatic traps or valves. It is further to be noted that the yielding or slidable valve stem, the thermostat, the bearing point or fulcrum of the thermostat, and the adjusting stem are all in axial alinement with each other, and with the outlet port and the center of the closing cap or cover, which arrangement insures the proper centering of all the elements or parts of the thermostatic device by entering the cap or cover into place, which is of great benefit and advantage for assembling the interior or operative elements or parts of the trap or valve in correct coöperative position and relation for use. It is further to be noted that with the preferred form of assembling the elements or parts of the thermostatic device, a ruptured or inoperative cell or chambered diaphragm, or a broken spring, or stem can be easily and quickly remedied or repaired, it only being necessary to remove the cap or cover and with it the elements or parts of the thermostatic device, replace the inoperative or broken element or part with a new one, which can be easily accomplished by forcing down the yieldable valve stem, removing the thermostat and substituting a new element or part for the impaired, inoperative or broken element or part, and reassembling the elements or parts by inserting them in their respective positions, and, if necessary, readjusting them by advancing or receding the threaded adjusting stem by the screw driver or otherwise as already described.

It is evident that the trap or valve of the present invention presents three improved and important features which are new in thermostatic traps or valves, namely: the entering of the thermostatic device in proper position by applying the cap or cover; the axial centering of all the elements or parts constituting the interior or operative mechanism of the trap or valve; and the ready removal or separating of the elements or parts by which repairs can be quickly and easily made at the place, where the trap or valve is in use. These three features of construction are of great benefit and advantage in the operation and use of the trap or valve, and add greatly to the practicability and operativeness of the trap or valve for general application and use.

What I claim as new and desire to secure by Letters Patent is:—

1. In a thermostatic trap or valve, the combination of a shell or casing inclosing a water chamber and having an open top, and an inlet into and an outlet from the water chamber, a cap or cover closing the open top of the shell or casing, a hanger attached directly to and depending from the cap or cover and entering into the water chamber, and a thermostatic device consisting of a slidable valve stem carried by the hanger, an expansible member mounted on the slidable valve stem, and an adjusting stem carried by the cap or cover, and between which and the slidable valve stem the expansible member is secured, the slidable valve stem controlling the outlet from the water chamber, substantially as described.

2. In a thermostatic trap or valve, the combination of a shell or casing having an open top and inclosing a water chamber and having an inlet leading into and an outlet leading from the water chamber, a cap or cover closing the open top of the shell or casing, a hanger attached directly to and depending from the cap or cover and entering into the water chamber, and a thermostatic device consisting of a slidable valve stem carried by the hanger, an expansible member detachably mounted on the slidable valve stem, and an adjusting stem carried by the cap or cover, and between which and the slidable valve stem the expansible member is detachably held in place, the slidable valve stem controlling the outlet from the water chamber, substantially as described.

3. In a thermostatic trap or valve, the combination of an outer shell or casing having an open top and inclosing a water chamber and having a side inlet leading into and a bottom outlet leading from the water chamber, a cap or cover closing the open top of the shell or casing, a hanger attached directly to and depending from the cap or cover and entering into the water chamber, and a thermostatic device consisting of a slidable valve stem carried by the hanger, an expansible member supported on the slidable valve stem, and an adjusting stem carried by the cap or cover, and between which and the slidable valve stem the expansible member is located and held, the slidable valve stem controlling the outlet from the water chamber, substantially as described.

4. In a thermostatic trap or valve, the combination of an outer shell or casing having an open top and inclosing a water chamber and having a side inlet leading into and a bottom outlet leading from the water chamber, a cap or cover closing the open top of the shell or casing, a hanger attached directly to and depending from the cap or cover and entering into the water chamber, and a thermostatic device consisting of a slidable valve stem carried by the hanger, an expansible member detachably supported on the slidable valve stem, and an adjusting stem carried by the cap or cover, and between which and the slidable valve stem the expansible member is removably supported and held, the slidable valve stem controlling the outlet from the water chamber, substantially as described.

5. In a thermostatic trap or valve, the combination of a shell or casing having an open top and inclosing a water chamber and having an inlet to and an outlet from the water chamber, a cap or cover closing the open top of the shell or casing, a U-shaped hanger attached directly to and depending from the cap or cover and entering the water chamber, a slidable valve stem carried by the hanger, a chambered diaphragm supported on the upper end of the slidable valve stem, and an adjusting stem carried by the cap or cover, and between which and the slidable valve stem the diaphragm is located and held, substantially as described.

6. In a thermostatic trap or valve, the combination of a shell or casing having an open top and inclosing a water chamber, and having an inlet to and an outlet from the water chamber, a cap or cover closing the open top of the shell or casing, a U-shaped hanger attached directly to and depending from the cap or cover, and entering the water chamber, a slidable valve stem carried by the hanger, a chambered diaphragm detachably mounted on the upper end of the slidable valve stem, and an adjusting stem carried by the cap or cover and between which and the slidable valve stem the diaphragm is removably mounted and held, substantially as described.

7. In a thermostatic trap or valve, the combination of a shell or casing having an open top and inclosing a water chamber, and having an inlet to and an outlet from the water chamber, a cap or cover closing the open top of the shell or casing, a pair of oppositely located arms attached directly to and depending from the cap or cover and entering the water chamber, a cross-arm connecting the lower ends of the side arms, a valve stem slidably mounted and guided in the cross-arm, a chambered diaphragm on the upper end of the slidable valve stem, and an adjusting stem carried by the cap or cover and between which and the slidable valve stem the diaphragm is located and held, substantially as described.

8. In a thermostatic trap or valve, the combination of a shell or casing having an open top and inclosing a water chamber with an inlet into and outlet from the water chamber, a cap or cover closing the open end of the shell or casing, a pair of oppositely located arms attached directly to and depending from the cap or cover, and entering the water chamber, a cross arm connecting the lower ends of the depending arms, a valve stem slidably mounted and guided in the cross-arm, a chambered diaphragm detachably mounted on the upper end of the slidable valve stem, and an adjusting stem carried by the cap or cover, and between which and the slidable valve stem the diaphragm is removably supported and held, substantially as described.

9. In a thermostatic trap or valve, the combination of a shell or casing having an open top and inclosing a water chamber with an inlet into and an outlet from the water chamber, a cap or cover closing the open end of the shell or casing, a pair of oppositely located arms attached directly to and depending from the cap or cover and entering the water chamber, a cross-arm connecting the lower ends of the depending arms, a valve stem slidably mounted and guided in the cross-arm, an uplift spring encircling the valve stem above the cross-arm, a chambered diaphragm detachably mounted on the upper end of the slidable valve stem, and an adjusting stem engaging the diaphragm and carried by the cap or cover, substantially as described.

10. In a thermostatic trap or valve, the combination of a shell or casing having an open top and inclosing a water chamber with an inlet into and an outlet from the water chamber, a cap or cover closing the open top of the shell or casing, a pair of oppositely located arms attached directly to and depending from the cap or cover and entering the water chamber, a cross-arm connecting the lower ends of the depending arms, a valve stem slidably mounted and guided in the cross-arms, a lifting spring encircling the valve stem above the cross-arm, a chambered diaphragm detachably mounted on the upper end of the valve stem, and an adjusting stem engaging the diaphragm and carried by the cap or cover and between which and the slidable valve stem the diaphragm is removably supported and held, substantially as described.

11. In a thermostatic trap or valve, the combination of a shell or casing having an open top and inclosing a water chamber with an inlet into and an outlet from the water chamber, a cap or cover closing the open top of the shell or casing, a pair of oppositely located arms attached directly to and depending from the cap or cover, and entering the water chamber, a cross-arm connecting the lower ends of the depending arms, a valve stem slidably mounted and guided in the cross-arm, a lifting spring encircling the valve stem above the cross-arm, a chambered diaphragm mounted on the upper end of the valve stem, an adjusting stem engaging the diaphragm and carried by the cap or cover, and a plug entered into the bottom wall of the water chamber, and having an outlet port controlled by the slidable valve stem, substantially as described.

12. In a thermostatic trap or valve, the combination of a closing cap or cover, a hanger attached directly to and depending from the cap or cover and adapted to enter the water chamber of the trap or valve, a slidable valve stem carried by the hanger and adapted to control the outlet from the water chamber of the trap or valve, a thermostatic member supported on the upper end of the valve stem, and an adjusting stem carried by the cap or cover and engaging the thermostatic member, substantially as described.

13. In a thermostatic trap or valve, the combination of a closing cap or cover, a hanger attached directly to and depending from the cap or cover and adapted to enter the water chamber of the trap or valve, a slidable valve stem carried by the hanger and adapted to control the outlet from the water chamber of the trap or valve, a thermostatic member detachably supported on the upper end of the valve stem, and an adjusting stem carried by the cap or cover, and between which and the valve stem the thermostatic member is removably located and held, substantially as described.

14. In a thermostatic trap or valve, the combination of a closing cap or cover, a pair of oppositely located arms attached directly to and depending from the cap or cover and adapted to enter the water chamber of the trap or valve, a cross-arm connecting the lower ends of depending arms, a valve stem slidably mounted and guided in the cross-arm, a chambered diaphragm on the upper end of the valve stem, and an adjusting stem carried by the cap or cover and engaging the diaphragm, substantially as described.

15. In a thermostatic trap or valve, the combination of a closing cap or cover, a pair of oppositely located arms attached directly to and depending from the cap or cover and adapted to enter the water chamber of the trap or valve, a cross-arm connecting the lower ends of the depending arms, a valve stem slidably mounted and guided in the cross-arm, a chambered diaphragm detachably supported on the upper end of the valve stem, and an adjusting stem carried by cap or cover and between which and the valve stem the diaphragm is removably located and held, substantially as described.

JAMES H. MARTIN, Jr. [L. s.]

Witnesses:
Oscar W. Bond,
Louis M. Berwin.